United States Patent [19]

Hassler et al.

[11] Patent Number: 5,113,866
[45] Date of Patent: May 19, 1992

[54] METHOD FOR ULTRASOUND IMAGING

[75] Inventors: Dietrich Hassler, Uttenreuth; Klaus Killig, Hoechstadt/Aisch, both of Fed. Rep. of Germany

[73] Assignee: Siemens Aktiengesellschaft, Berlin and Munich, Fed. Rep. of Germany

[21] Appl. No.: 632,924

[22] Filed: Dec. 24, 1990

[30] Foreign Application Priority Data

Jan. 15, 1990 [DE] Fed. Rep. of Germany ..... 90100754

[51] Int. Cl.$^5$ ............................................... A61B 8/00
[52] U.S. Cl. ........................... 128/661.01; 128/660.05; 128/660.06; 73/625; 73/597
[58] Field of Search ............... 128/660.01, 660.05, 128/660.06, 660.07, 661.01, 661.02; 73/602, 625, 645–648, 597, 596

[56] References Cited

U.S. PATENT DOCUMENTS

| | | | |
|---|---|---|---|
| 4,580,451 | 4/1986 | Miwa et al. | 128/661.01 |
| 4,658,827 | 4/1987 | He et al. | 128/660.06 |
| 4,691,570 | 9/1987 | Hassler | 128/661.01 |
| 4,817,614 | 4/1989 | Hassler et al. | 128/660.05 |
| 4,830,016 | 5/1989 | Tamano et al. | 128/660.05 |
| 4,841,492 | 6/1989 | Russell | 128/660.06 |
| 4,989,143 | 1/1991 | O'Donnell et al. | 128/661.01 |

FOREIGN PATENT DOCUMENTS 0320303 6/1989 European Pat. Off. ....... 128/660.05

Primary Examiner—Francis Jaworski
Assistant Examiner—George Manuel
Attorney, Agent, or Firm—Hill, Van Santen, Steadman & Simpson

[57] ABSTRACT

A method for generating an ultrasound image of a plane of a section of an examination subject having a non-uniform speed of sound distribution near the surface of the subject includes the steps of scanning the section plane line-by-line with a transducer array in an adaption phase and calculating values from the received, focussed echo signals which deviate from anticipated values which would arise given a uniform speed of sound distribution, the calculation being undertaken by a cross-correlation function of neighboring elementary transducers. Correction values are formed from the deviating values depending on the angle of incidence of the echo signals on the elementary transducers. In an imaging phase following the adaption phase, the delay values for focussing are modified dependent on the incident angle of the echo signals and dependent on the correction values for this incident angle. Image disturbances due to the non-uniform speed of sound distribution can thus be compensated even in the presence of thick, transducer-proximate disturbing layers in the examination subject.

20 Claims, 9 Drawing Sheets

METHOD FOR ULTRASOUND IMAGING

BACKGROUND OF THE INVENTION

1. Field of the Invention

The present invention is directed to a method for ultrasound imaging, and in particular to such a method for producing an image of plane of a section of an examination subject having a surface-proximate region having a non-uniform speed of sound distribution.

2. Description of the Prior Art

An ultrasound imaging method is described in European application 0 256 481, corresponding to U.S. Pat. No. 4,817,614, which includes scanning the plane of the section to be imaged line-by-line both in an adaption phase and in an imaging phase. In the adaption phase, an image is not generated, but instead the signal delays of the signals received by the elementary transducers are compared to signal delays which would be expected given a uniform speed of sound distribution in the examination subject, and deviations from the expected values are calculated in aperture of the transducer array. In the imaging phase, correction values for reception focussing along an individual scan line are formed from the deviating values for a respective plurality of scan lines. The delay times with which the echo signals are delayed by the elementary transducers are modified dependent on the correction values in the imaging phase given focussed reception, so that image disturbances due to the non-uniform speed of sound distribution are compensated. This known method is referred to as the "principle of the adaptive antenna" or as the "principle of the adaptive aperture change."

In the adaption phase, the disturbing effects on the signal in the subcutaneous fatty tissue are measured once in the section plane of interest. In the following imaging phase, these disturbing effects are compensated in each scan in the sense of the adaptive antenna. The measurement of the disturbing effects caused by the non-uniform speed of sound distribution, which is implemented first, ensues exclusively on the basis of the reflected echo signals from the body of the patient. A cross-correlation of neighboring elementary transducers of the ultrasound array is formed. Variations in the speed of sound in the examination path of the patient immediately preceding the ultrasound array are determined by deviations in the maximum of the cross-correlation function compared to the anticipated value of the case of uniform distribution.

In order to avoid image artifacts, the following averaging possibilities are available.

The echo signals of a sufficiently large depth region of the examination subject can be used for the correlation. The depth region is selected so that the paths to the points at the boundaries of the depth region, in the region of the transducer-proximate disturbing layer, do not proceed significantly differently. The thinner the disturbing layer is assumed to be, the larger the depth regions can be selected. Conversely, the depth regions must be selected smaller if the thickness of the disturbing layer is increased.

Further noise suppression can be achieved by averaging the measured values of a plurality of neighboring scan lines. The aforementioned path differences must also be taken into consideration in this technique.

Another possibility for acquiring a number of different data sets independent of one another is that of measuring over a longer time span and averaging the data.

A disadvantage is that differences in the echo signals will arise due to motion in the interior of the body over this longer time span.

In addition to the immediately preceding technique, an intentional, slight tilting of the transducer array can be used to create the independent data sets.

All of these averaging methods permit compensation of disturbing effects if the inhomogeneities in the surface-proximate region of the examination subject extend to a depth of approximately 10 mm. Given thicker disturbing layers in front of the ultrasound array, the differences in the transit times to the transducers become too significant to make use of the above techniques. The fluctuation of the speed of sound in the disturbing layer acts differently on the signal of an elementary transducer dependent on the position of the transducer within the active aperture.

SUMMARY OF THE INVENTION

It is an object of the present invention to provide an ultrasound imaging method of the type described above wherein image disturbances due to a non-uniform speed of sound distribution in the examination subject can be compensated even in the presence of disturbing layers of increasing thickness.

the above object is achieved in an ultrasound imaging method wherein the deviating values and the correction values for the delay times are formed in the adaption phase dependent on the angle of incidence of the echo signals on the elementary transducers, and the delay values in the subsequent imaging phase are modified dependent on the angle of incidence of the echo signals and dependent on the correction values for the angles of incidence.

Due to the calculation of the deviating values and the corrections for the delay times dependent on the angle of incidence, it is assured in the averaging that the signal transit paths of the echo signals used for the averaging are not accessibly different.

In an embodiment of the invention the deviating values and the correction values for the delay times are formed for a range of incident angles whose boundaries are defined such that the phase shift of the focused echo signals which are incident on the elementary transducers within the range of incident angles remains below a threshold. The combination of a plurality of angles of incidence to form a range of angles of incidence considerably reduces the apparatus outlay and the time for calculating the correction values.

In a further embodiment, the overall region of angles of incidence between two maximum angles of incidence is divided into regions of angles of incidence which are of identical to size and which are valid for all transducer elements. As a result of this method step, the outlay for calculating the correction values is further reduced.

In another embodiment, the measurement of the deviating values is based on the cross-correlation of the echo signals of neighboring elementary transducers of the ultrasound array. The shift of the maximum of the correlation function relative to an anticipated value for the uniform distribution case corresponds to variations in the speed of sound in the examination region immediately preceding the ultrasound array.

In another embodiment, the scan line is divided into adjoining depth regions which are valid for all elementary transducers for all scan lines. Because the depth regions are valid for all of the scan lines, the outlay for calculating the correction values is further reduced.

DESCRIPTION OF THE PREFERRED EMBODIMENTS

Figure 2:
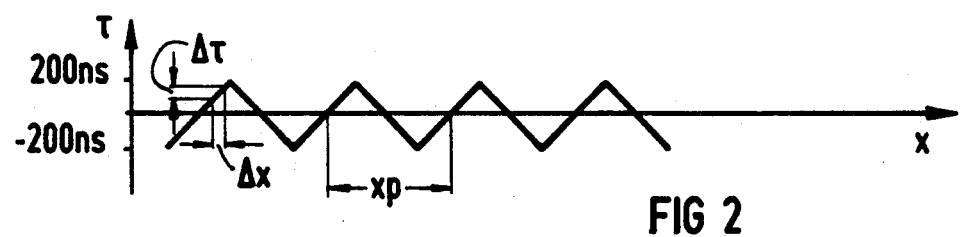
FIG. 2 shows the transit time distribution of a thin, transducer-proximate disturbing layer in the examination region.
Figure 1:
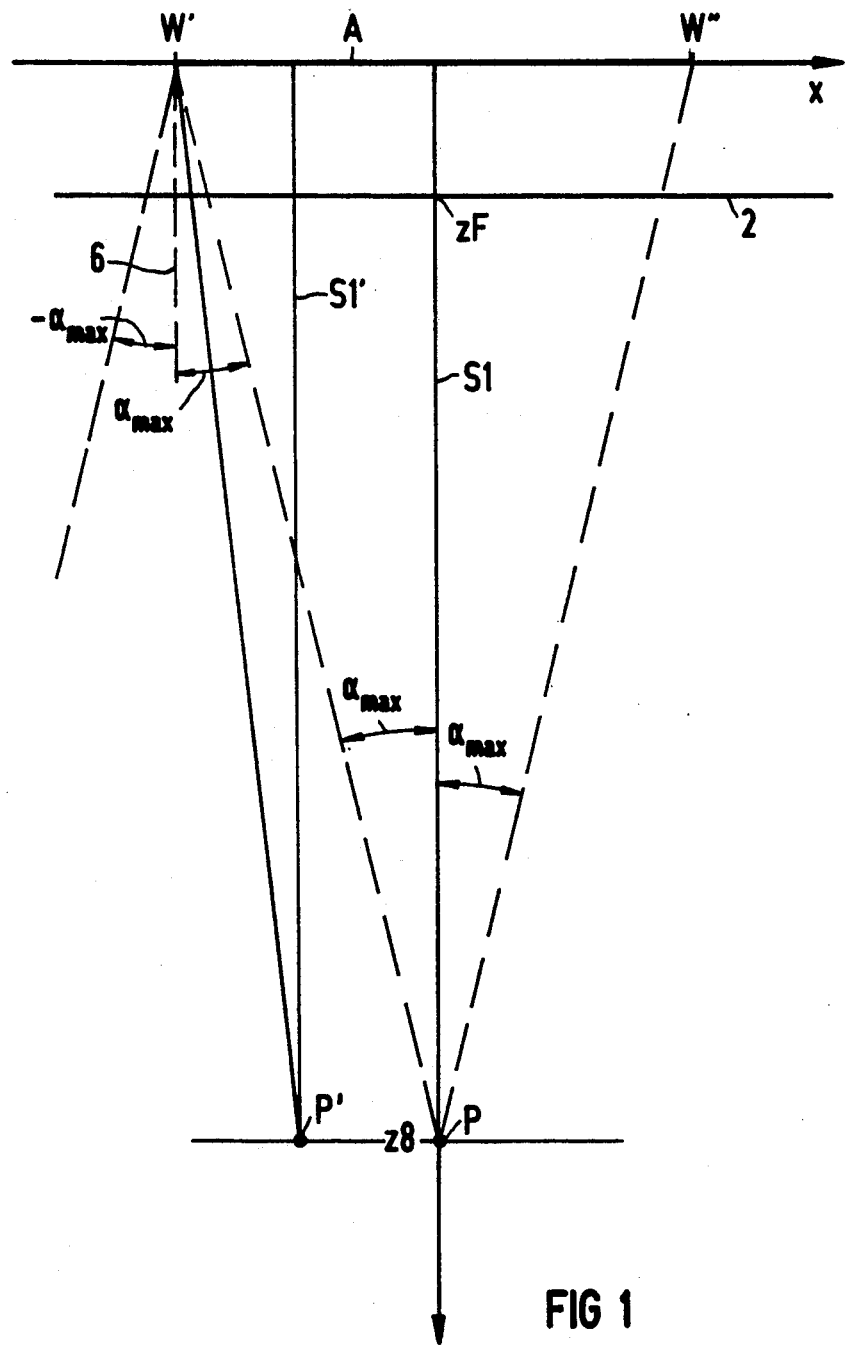
FIG. 1 is a schematic cross section showing the geometrical relationships of an examination region with an applied transducer array for explaining the method for ultrasound imaging disclosed herein, the examination region having a transducer-proximate non-uniform distribution of the speed of sound.

FIG. 1 schematically shows a transducer array whose sound-emitting and sound-receiving surface, i.e. the elementary transducers of the array, is illustrated by x-axis. The elementary transducers are acoustically coupled to an examination region at the x-axis. In FIG. 1, the examination region extends downwardly from the x-axis in the direction of the z-axis. A thin disturbing layer 2 is situated in the examination region parallel to the x-axis at a distance zF in front of the array. This disturbing layer 2 causes a transit time fluctuation proceeding triangularly along the x-axis, as shown in FIG. 2. The thin disturbing layer 2 is a simplified model of a layer having a non-uniform speed of sound distribution which extends from the x-axis to the depth zF. It is assumed that the thin disturbing layer 2 is situated at a depth zF of approximately 20 mm.

An active transmission and reception aperture A in the transducer array is limited by elementary transducers $W'$ and $W''$. The width of the aperture A may be, for example, 80 mm. The aperture A forms a central transmission and reception beam, or scan beam, S1 in the direction of the z-axis.

The elementary transducers of the active aperture A can receive echo signals only from a limited, maximum range of incident angles from $-\alpha_{max}$ through $\alpha_{max}$. The maximum incident angle $\alpha_{max}$ refers to the vertical (normal) emission and reception direction 6 of the elementary transducer. For a given aperture A, the angle $\alpha_{max}$ defines a point P lying closest to the transducer array to which focussing can be achieved. It is assumed in FIG. 1 that the point P to which the largest aperture A can focus is at a depth z8 of 160 mm on the z-axis. It is further assumed for a clear presentation that an imaging system having a constant focussing number (160 mm/80 mm=2 in this case) is present, i.e. the maximum incident angle $\alpha_{max}$ of the transducer $W'$ or $W''$ of the aperture A is identical for all depths. In the example of FIG. 1, $\alpha_{max}=14°$.

If the active aperture A is shifted so that it generates a scan beam S1', the echo signals from point P' to the transducer $W'$ traverse different regions of the disturbing layer 2 than do the echo signals from point P in the case of the transmission beam S1. Different echo transit times on the way to the transducer $W'$ through the disturbing layer 2 are thus angle-dependent. The angular range within which the phase shift remains below a threshold, for example 1/10 of the period of the sound wave, can then be calculated. In this range, the return paths can be viewed as being identically disturbed, because adding signals shifted to such a slight extent relative to one another yields a negligibly small error.

A curve of the fluctuations of the transit time in the boundary layer 2 in the direction of the x-axis is shown in FIG. 2. The transit time fluctuations correspond to the inverse fluctuations in the speed of sound in the boundary layer 2. The curve of the transit time fluctuations is triangular with a period xp. In the example of FIG. 2, the maximum amplitude of the transit time fluctuation is approximately 200 ns, given a period xp=20 mm.

Given a sound frequency of 2.5 MHz and a disturbing layer corresponding to FIG. 2 at a distance zf=20 mm from the array surface (i.e., from the x-axis) the following values represent the compensatable phase shift and the angular range.

Figure 3:
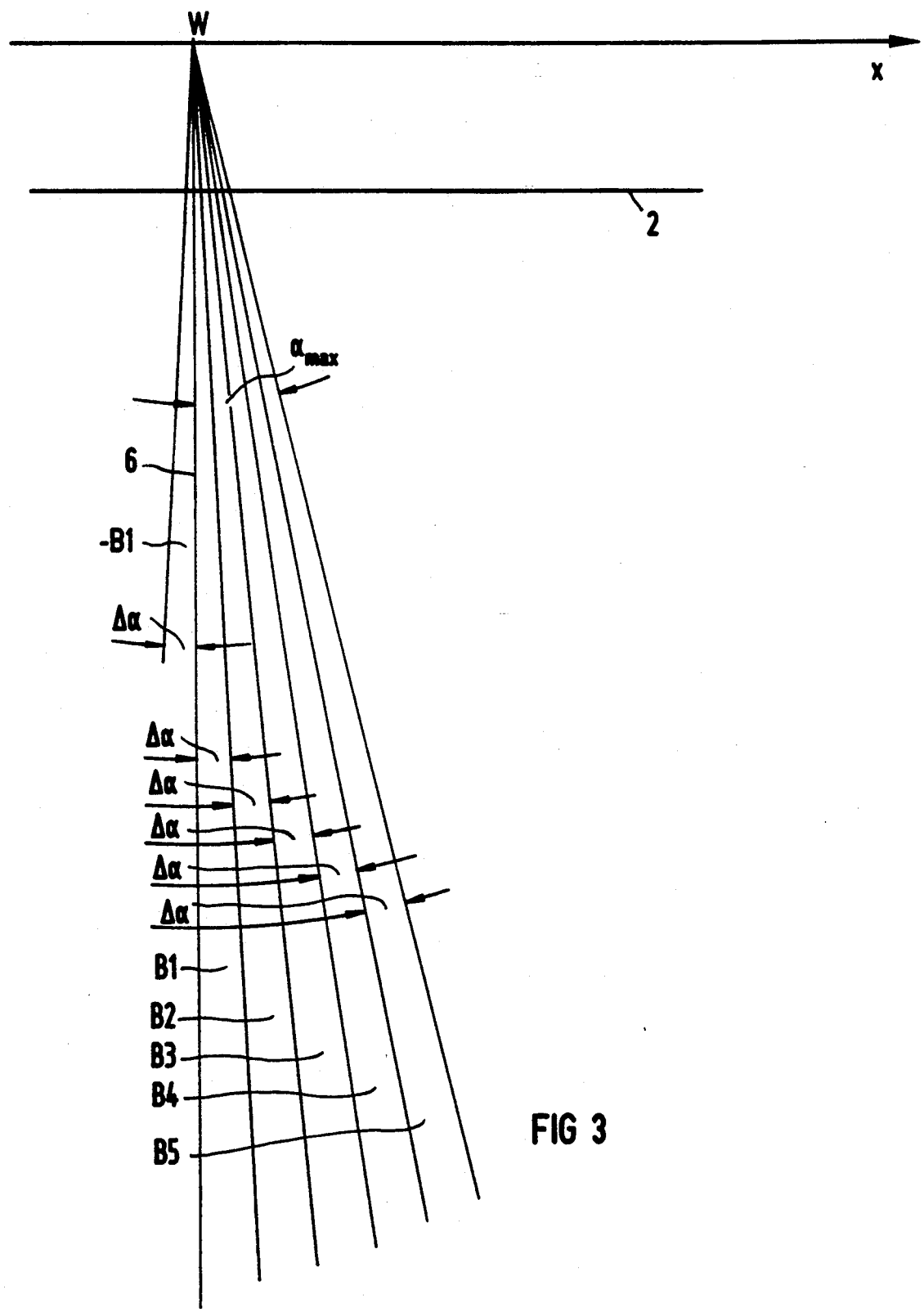
FIG. 3 shows a division of the overall region of incident angles of an elementary transducer into regions of incident angles of identical size, within which the incident echo signals can be considered to be identically disturbed by the disturbing layer.

The duration T of the period of the sound wave at a frequency of 2.5 MHz is 400 ns. A compensatable phase shift of 1/10 T=40 ns thus derives. This means that the echo signals which traverse a region of x=1 mm in the disturbing layer can be viewed as being identically disturbed. For clarity, the compensatable phase shift $\alpha_T$ and the region $\Delta x$ of the disturbing layer are shown exaggerated in FIG. 2. The angular range within which the phase shift remains below the limit of 1/10 T is thus $\Delta \alpha = 2.86°$. When the maximum angle of incidence with respect to the perpendicular 6 is $\alpha_{max}=14°$ it can be divided into five angular ranges. These five angular ranges of an elementary transducer W are shown in FIG. 3. The respective width of the ranges is $\Delta \alpha$, the ranges lying closest to the perpendicular 6 are referenced B1 and $-B1$ and the remaining ranges are continuously numbered through range B5, the ranges being disposed symmetrically relative to the perpendicular 6. The total range of incident angles between $-\alpha_{max}$ and $\alpha_{max}$ is thus divided into ten angular ranges $-B5$ through B5, having the width $\Delta\alpha$.

Figure 4:
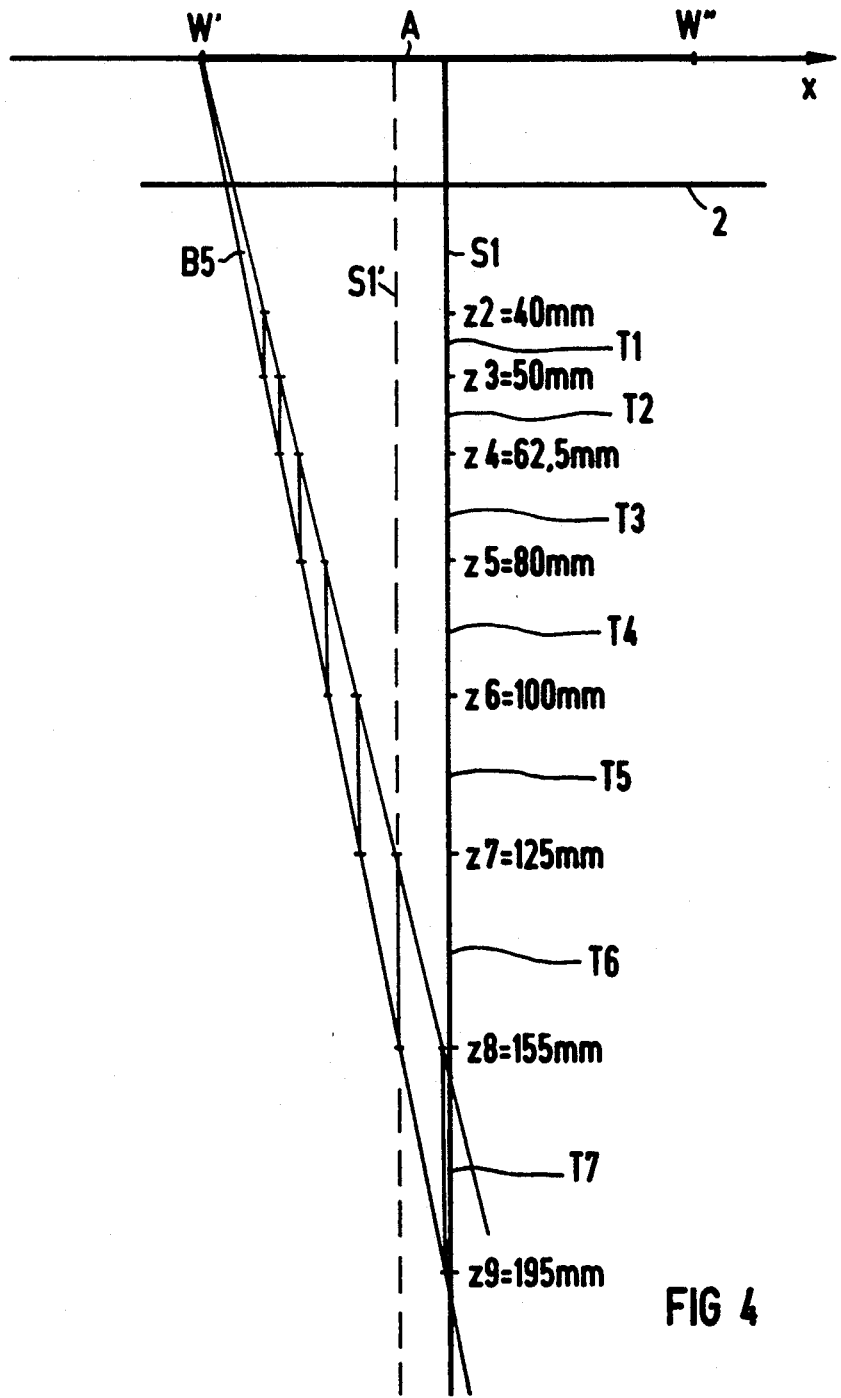
FIG. 4 shows the division of a scan line into adjacent depth regions.

In FIG. 4, the angular range B5, deviating most from the perpendicular 6, is emphasized for an edge transducer W' of the aperture A. Given transmission along the transmission beam S1 (shown idealized), it can be seen that only echo signals from the depth region z8 through z9 with respect to the transducer W' can be considered to be identically disturbed. Only echo signals selected in this fashion are permissible for use for calculating the transit time disturbances for the angular range B5. The statistical basis for the measurement, and thus the precision, however, decrease with this clipping.

When, during a scan event (a parallel scan, in this example), the transmission beam comes to lie along the straight line S1' signals of the transducer W' only from the depth region z7 through z8 are correlated with the corresponding, depth-selected signals of the transducers which neighbor the transducer W'. The procedure can be correspondingly continued, so that the large depth region from z2 through z9 is used to calculate the disturbance in the angular range B5 for the elementary transducer W'.

The correlation for the angular range B5 with respect to the transducers neighboring the transducer W', however, is permissible only within a limited environment of the transducer W'. The size of this region shall be discussed below.

The depth regions on the transmission and reception beam S1, or on the scan line, are defined as follows. The maximum angular range B5 of the edge transducer W' (or W'') of the largest aperture A defines the depth region T7 farthest from the array surface. The intersections of the reception angular range B5 with the scan line S1 yield the points z9 and z8 on the scan line S1. The origin of the angular range B5 is then shifted to such an extent within the aperture A that the side of the angular range B5 which previously defined the depth z9 now intersects the scan line in the depth z8. The intersection of the other side of the angular range B5 defines the transducer-proximate boundary of the depth region T6. The depth T6 directly adjoins the depth region T7 in the direction of the transducer array. The depth region T5 adjoining the depth region T6 is analogously calculated, as are the other depth regions.

Figure 5:
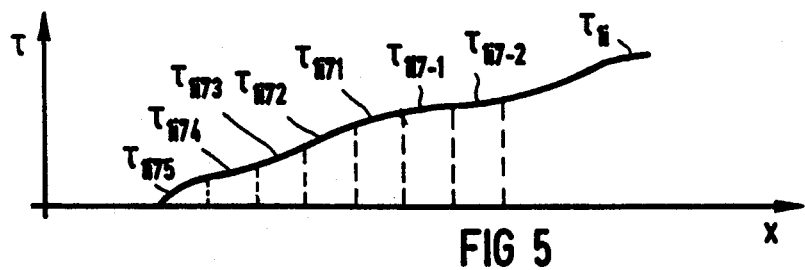
FIG. 5 shows the curve of deviating values for a depth region which is formed from the integration of the deviating values acquired from the cross-correlation function.

Corresponding to the method disclosed in the aforementioned European application 0 256 481 and U.S. Pat. No. 4,817,614, FIG. 5 shows the transit time curve $\tau$ integrated over the aperture A, as derives from the correlation of the echo signals from the depth region T7. The curve sections dependent on the angular ranges B5 through $-B5$ are additionally shown. The index of the individual curve sections of the deviating values curve is defined as follows:

First index digit: number of the transmission beam (transmission beam S1 in this example);

Second index digit: number of the transducer (the transducers are not individually identified since the curve of the deviating values is entered over the transducers in FIG. 5);

Third index digit: number of the depth region (depth region T7 in this example); and Fourth index digit: number of the angular range (B5 through $-B5$ in this example).

In FIG. 5, thus, the left-most curve section $\tau_{1i\,75}$ of the deviating value curve represents the integrated deviating values of the transducer i for the angular range B5 which were acquired from the depth region T7 using the scan beam S1.

Figure 7:
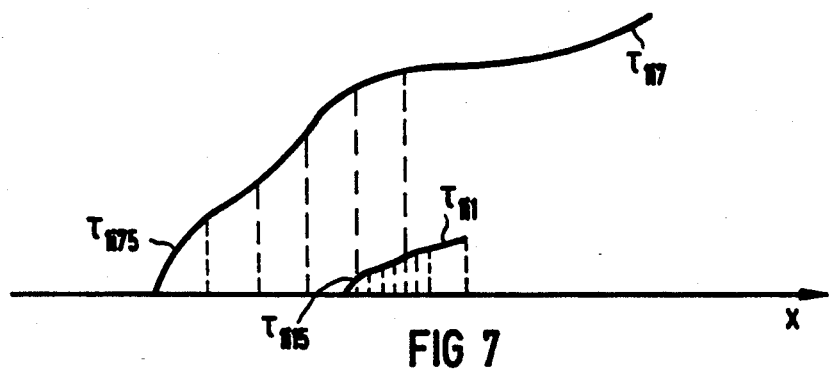
FIG. 7 shows deviating value curves for two different depth regions.
Figure 6:
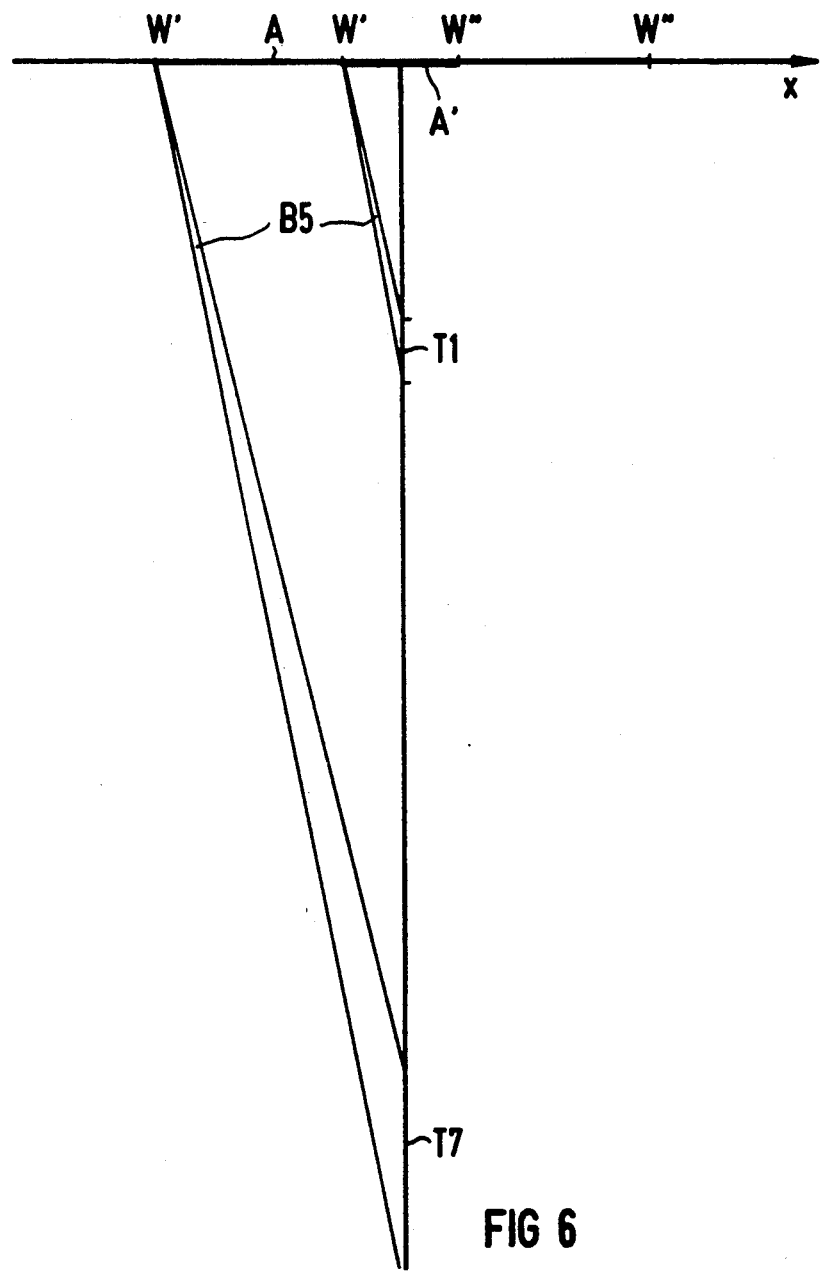
FIG. 6 shows the geometrical relationships given a constant focussing number.

Corresponding curves are obtained from the correlations of signals from different depth regions, as indicated by example in FIGS. 6 and 7 for the depth regions T1 and T7. For the depth region T1, the integrated curve, given a system having constant focussing number, extends onto a smaller aperture A'. The sub-regions of the deviating value curve for the depth region T1, defined by different reception angle ranges, lie closer together than in the curve for the depth region T7. Corresponding curves are obtained for all scan lines of the section plane.

Using the known method of minimizing the sum of all of the squares of the deviating values ("least squares" method), a compensating straight line AG is placed in each deviating value curve allocated to a depth region. The difference values between the deviating value curve and the straight line AG from the basis for the further signal processing, as a corrected deviating value curve. The errors which arose due to the "lock-in" of the adaptive antenna are removed from the data in this way. This "lock-in" can arise in the following way. An extremely strong reflector residing at the side of the transmission beam is slightly co-irradiated by the transmission beam. The echo signal of this strong reflector can so greatly dominate the echo signals generated by the central ray that the adaptive antenna focusses on this reflector over a large scan region, and always apparently views only this reflector in the reception case, instead of carrying out a scan motion. By eliminating the possible "skew" in the measured curve by means of the compensating straight line AG, this disturbing effect is suppressed.

Figure 8:
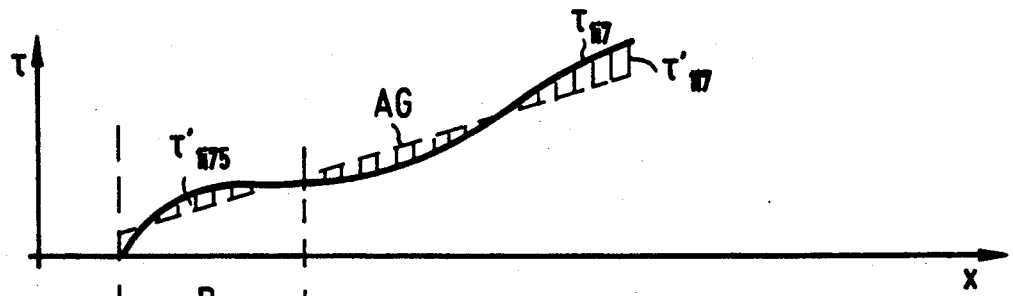
FIG. 8 shows the formation of the corrected deviating value curve from the deviating value curves of a scan beam and a depth region.
Figure 9:
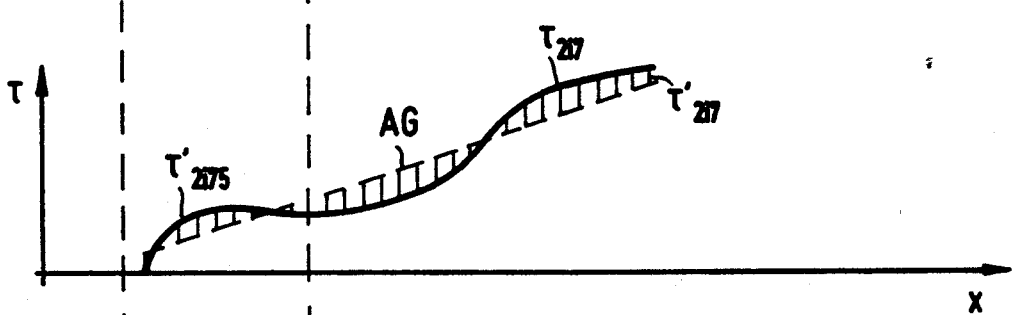
FIG. 9 shows the formation of the corrected value deviating curve from the deviating value curves of the neighboring scan beams.
Figure 10:
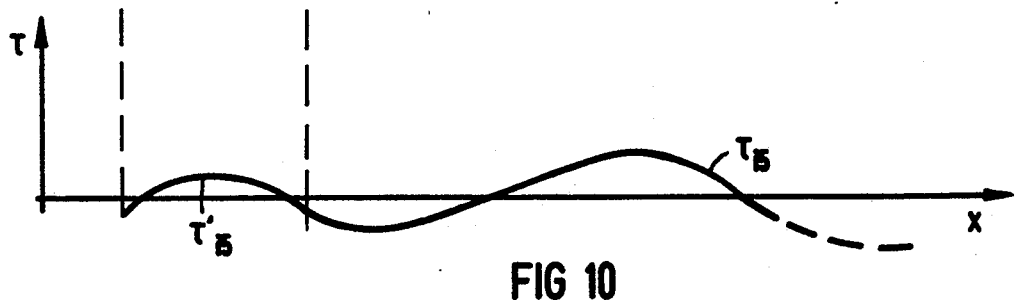
FIG. 10 shows the formation of auxiliary correction values for an incident angle range from the corrected deviating value curves of all depth regions and scan beams.

Calculation of the corrected deviating value curves is set forth in FIGS. 8 through 10. FIG. 8 shows the deviating value curve with reference to the scan line S1 and the depth region T7. The range for the incident angle B5 is shown with dashed lines. The difference values of the deviating value curve compared to the compensating straight line AG are referenced $\tau'$. FIG. 9 shows a curve corresponding to the curve of FIG. 8 for the scan line S2, with the parameters being otherwise the same. The deviating value curve of the scan line S2 in FIG. 9 is shifted by one transducer element relative to the curve in FIG. 8. The other curves for the other depth regions are not shown because, except for a compression or stretching in the x-direction, they will basically have the same appearance.

Because the curves for the different depth regions and different scan lines contain different integration constants, either the process of "aligning" must be introduced, as disclosed in European application 0 256 481 and U.S. Pat. No. 4,817,614, or the effect of the different integration constants on the curve sections of the corrected deviated value curves which are valid for an angular range, for example the angular range B5, must be eliminated before the intended averaging of all values. For this purpose, the mean value of the curve section is formed and is subsequently subtracted from this curve section.

For each transducer (index i in the corrected deviating value curve), all corrected deviating values (for which the effect of the different integration constants has been eliminated) for the same angular ranges in different scan lines and depth regions are now averaged with each other, or are added. This yields the auxiliary correction value curve $\tau_{i5}$ for the incident angle range B5 shown in FIG. 10. For all elementary transducers of the array, the auxiliary correction value curve $\tau_{i5}$ contains the correction values for the echo signals which are incident on the corresponding elementary transducers from the angular range B5.

Corresponding curves are formed for the other angular ranges, so that 10 auxiliary correction value curves for the ten angular ranges —B5 through B5 are present as the final result. These curves contain the information needed for the entire adaption, even for large apertures.

Figure 11:
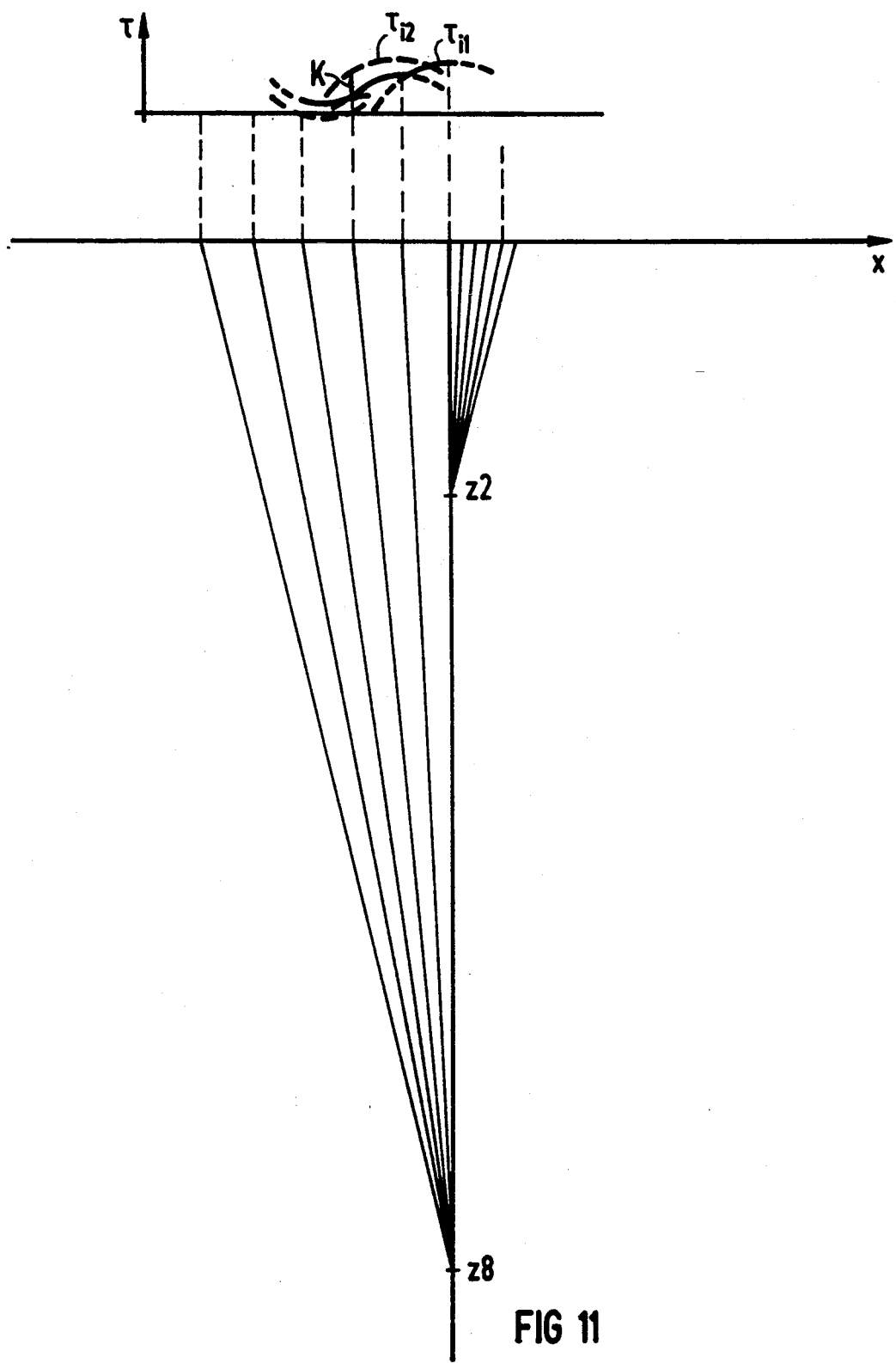
FIG. 11 shows the formation of correction values for the imaging phase from the auxiliary correction value curves shown in FIG. 10.

FIG. 11 shows how the data for a specific, active aperture are compiled from the auxiliary correction values acquired in the manner described above. This requires a separate consideration because all results which were acquired from the echo signals of different depth regions contain different integration constants, as noted above. Because the integration constant is not required for the correction of the focussing, it is sufficient to insure that only one common constant appears within an aperture. A different constant can appear between different apertures. This only results in a pulse shift in the aggregate signal, which is negligibly small when measured with reference to the pulse envelope required for imaging.

The necessity for a common integration constant per aperture results from the requirement that the curve of the correlation values cannot have any discontinuities over the total aperture. According to FIG. 11, consequently, the portions of the angular ranges corresponding to a defined aperture are removed from the ten auxiliary correction value curves, and are joined to each other so that no discontinuities occur at the joints. Since the most reliable values are present for the middle of the aperture, an additional constant is begun with the angular ranges B1 and —B1 without shift, or without addition, and the neighboring ranges B2 and —B2 are each shifted by so much that the boundary values of a plurality of overlapping, edge-proximate curve values coincide in the sense of "aligning." This is continued to the outermost angular range, and an overall curve of the correction values for the complete aperture A is obtained.

As was shown in FIG. 4, the distance between the scan lines S1 and S1', which define the depth regions T7 or T6 from the prescribed angular ranges, is of such a size that many scan lines have room therebetween. Based on the discussion thus far, new depth regions must be defined for the intervening scan lines and new correlation values must be calculated. To avoid the outlay associated with those cumulative steps, a simplification of the method is shown in FIG. 12.

Figure 12:
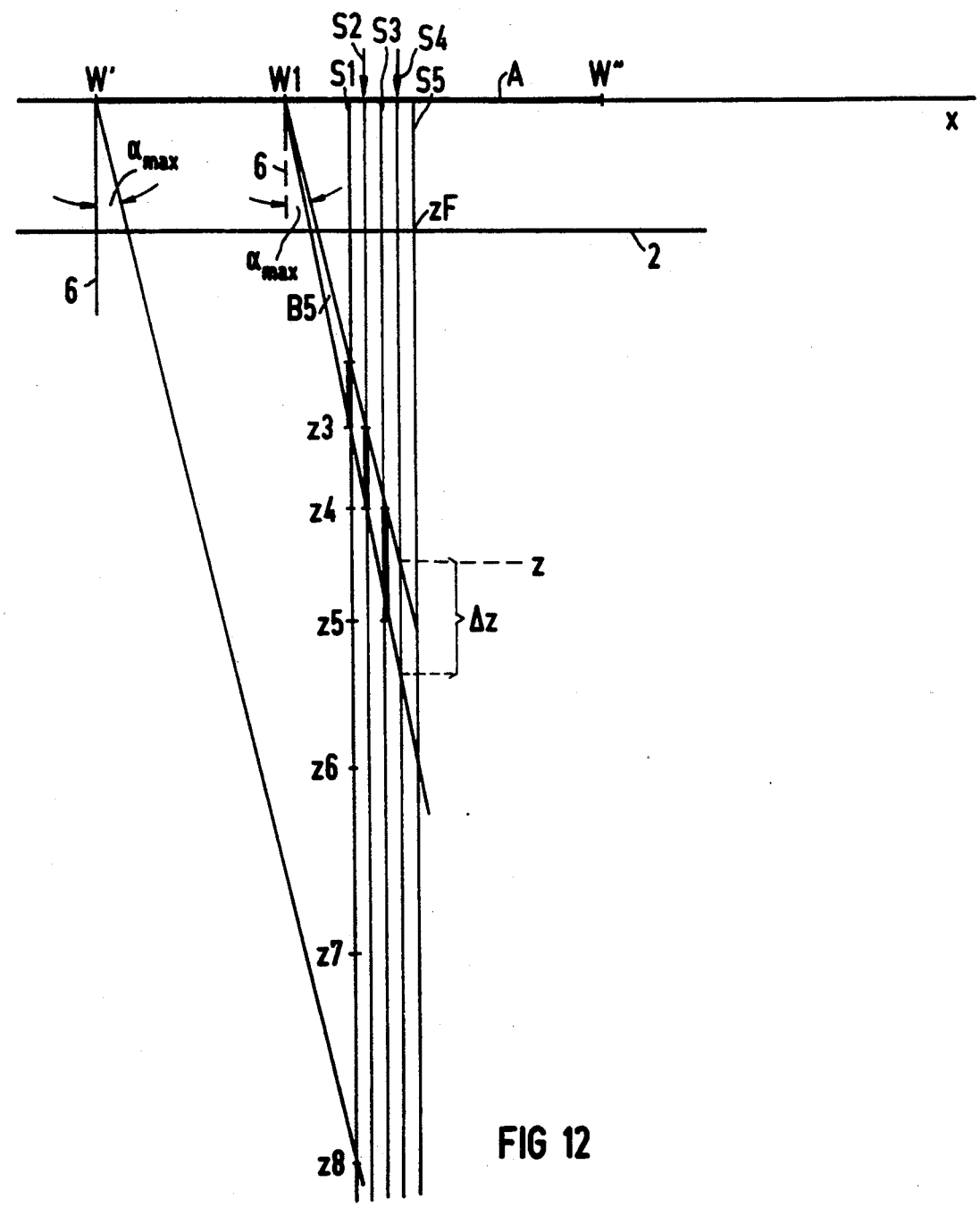
FIG. 12 shows a simplified allocation of the deviating values to the depth regions.

In the embodiment of FIG. 12, the transducers W' and W" are the elementary transducers at the opposite edges of the aperture A, which transmits along a scan line S1. The depth regions T1 through T7 are defined by the points z2 through z8, analogously to FIG. 4. An elementary transducer W1 covers the depth regions z2 through z3 in the region B5 on the scan line S1. Given the scan line S4, however, it would have to cover region referenced $\Delta z$, which does not coincide with the region z4 through z5. In the simplified method, new correlations with the signals from this depth region are foregone, and the correlation result of the signals from the depth region z4 through z5 is used instead. Correlation results from defined depth regions which cover at least half of an actual depth region are used for averaging.

Because the correlations respectively cover on the reception angle ranges, the correlations are formed from extremely short echo signal excerpts, and therefore measuring errors for the deviating values are possible. Despite averaging, these errors can be more significant than those which would arise given a correlation of long signal excerpts, because small signal values do not significantly contribute to the correlation result in the correlation of long signal excerpts. Because the amplitudes of the cross-correlation functions are not taken into account in the evaluation of the correlation, the correlation of low signal amplitudes of a small echo signal excerpt may be unduly emphasized. It is therefore useful to undertake a weighting according to the height of the maximum of the correlation function in the averaging of the corrected deviating values.

Alternatively, a value corresponding to the averaged value can be directly acquired for echo signals which are substantially perpendicularly incident on the array. For this purpose, an angular range must be introduced which lies symmetrically relative to the scan line by $\pm \Delta \alpha / 2$. If a phase transit error of $\pm 1/10$ of the duration of the period is permitted, instead of only $+1/10$ of the duration of the period, the ranges B1 and —B1, B2 and —B2, B3 and —B3, B4 and —B4, and B5 and —B5 can then be combined so that only five angular ranges remain. The correlations from the long echo sequence from the depth z2 through z9 can replace the averaging result for the region B1 and —B1.

$N-1$ correlations now arise per scan line and depth region, with N being the number of active elementary transducers of the aperture which are evaluated in view of their maximum shifts. The maximum shift yields the deviating value. The following steps are then implemented:

1. The deviating value curve $\tau$ is formed by adding the deviating values with an arbitrarily selected starting value, for example zero, for an outermost edge element;
2. A compensating straight line AG is placed in the deviating value curve according to the method of least squares;
3. The deviations of the deviating value curve from the compensating straight line AG are identified and are further processed as a corrected deviating value curve; and
4. The corrected deviating value curve is subdivided according to the angular ranges B5 through —B5.

Figure 13:
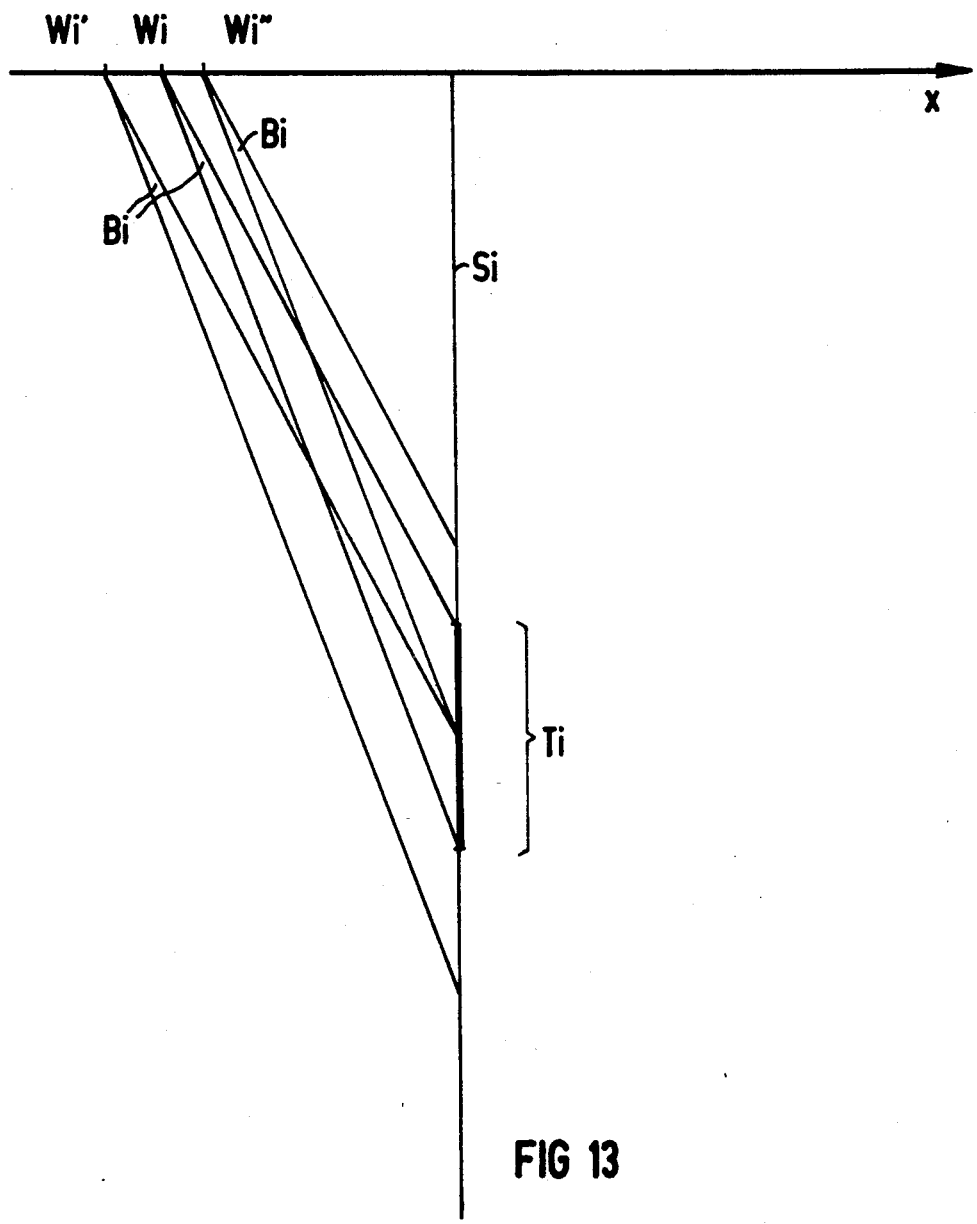
FIG. 13 shows a simplified calculation of an incident angle boundary in the deviating value curve of a scan beam from the prescribed depth regions.
Figure 14:
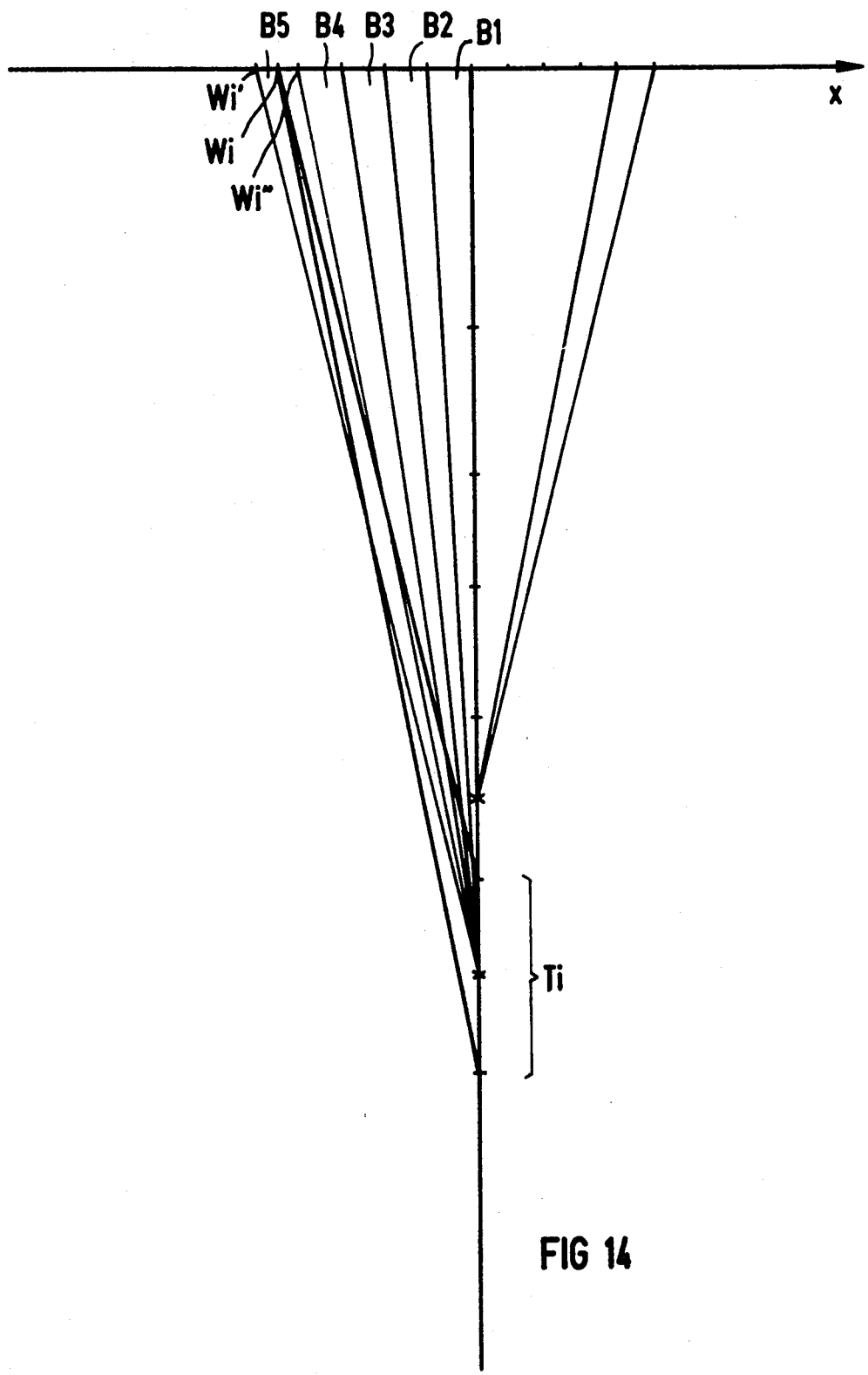
FIG. 14 shows a modification for simplified calculation of the incident angle boundary in the deviating value curve of a scan beam from a prescribed depth region.

The range boundaries of the angular ranges can be found according to the procedure set forth with respect to FIG. 12 when the problem is reversed, i.e., it is not the transducer that is given and the depth region which is sought, but instead the depth region is given and the transducer is sought. This is shown as an example in FIG. 13. The depth region Ti is well-covered by the transducer Wi in the angular Bi. The permissible boundary positions are reached when the angular range Bi is laterally shifted parallel such that half of the depth region Ti in question is still covered by the angular range Bi. This defines a region in the aperture for the transducer Wi' to the transducer Wi" to which the deviating value from the depth region Ti in the angular Bi can be allocated. The same result is found according to FIG. 14, when the angle fan of the angular ranges B1 through B5 and from —B1 through —B5 of the middle of the depth region Ti at the greatest distance from the array surface is projected back on to the array.

Continuing in the method steps:

5. The identical portions are removed from the subsection of the deviating value curves belonging to each angular range;
6. The auxiliary correction values formed in this manner are allocated to the transducer locations and are average with the already existing, stored values, weighted as warranted.

This occurs for each depth region and for all scan lines. Ten (or five) curves for the ten (or five) angular ranges valid for the entire array thus derive.

Neighboring curves must have a certain similarity. This is used to recognize gross errors in that the differences between the neighboring curves are monitored for an upward transgression of an upper limit value.

Continuing in the above method:

7. For a defined aperture to be corrected and for a focussing depth, the depth region lying closest to the aperture and the division of the angular ranges belonging thereto are sought, in the manner employed in the allocation of the angular ranges;
8. With this division, the required regions are "cut out" from the ten (or five) auxiliary correction values curves, as set forth in FIG. 11; and
9. The curve sections of the auxiliary correction value curves allocated to the angular ranges are shifted such that no discontinuities occur at the transition locations.

The correction values calculated in this manner can now correct the delay values to conform to values which are valid for uniform velocity distributions in the imaging phase which follows the adaption phase, and can thus improve the quality of the image.

Instead of being employed in the imaging phase, these correction values may be employed for transmitting in the adaption phase in a following, further transmission and reception cycle, as disclosed in European application 0 256 481 and U.S. Pat. No. 4,817,614. Modified correction values for the imaging phase are thereby acquired from the echo signals of the second transmission and reception cycle. Additionally, transmission can be undertaken with corrected delay values in the imaging phase for improving the image quality.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for ultrasound imaging of an examination subject having a layer having a non-uniform speed of sound distribution, comprising the steps of:

beginning an adaption phase by ultrasonically scanning a plane section of said examination subject including said layer line-by-line using a transducer array consisting of a plurality of side-by-side transducers;

receiving ultrasound echo signals from said examination subject in an aperture of said transducer array, said echo signals having respective signal delays associated therewith and said echo signals being incident on said transducers in said aperture at respective angles of incidence relative to the scan lines;

for each scan line, comparing the signal delays of the received echo signals with signal delays which would focus the transducers of the transducer array on said scan line giving a uniform speed of sound distribution in said layer;

calculating deviating values for the signal delays of the echo signals for a scan line dependent on said comparing and on the angle of incidence of the echo signals on said transducers;

calculating a correction value for each angle of incidence, for focussing each scan line, from said deviating values for the delays in a selected plurality of scan lines;

beginning an imaging phase by ultrasonically scanning said plane section of said examination subject including said layer line-by-line using said transducer array;

receiving further ultrasound echo signals from said examination subject in said aperture of said transducer array, said further echo signals having respective signal delays associated therewith and said further echo signals being incident on said transducers in said aperture at said respective angles of incidence relative to the scan line; and modifying the signal delays of the further echo signals dependent on the angle of incidence of the echo signals and dependent on the correction value for that angle of incidence calculated in the adaption phase.

2. A method as claimed in claim 1 wherein the step of calculating deviating values is further defined by calculating deviating values for the signal delays of the echo signals for a scan line dependent on said comparing and on an incident angle range having boundaries defined such that the phase shift of the echo signals incident on said transducers within said angle range is below a selected threshold, and wherein the step of calculating a correction value is further defined by calculating a correction value for each incident angle range.

3. A method as claimed in claim 2 comprising the additional step, in said adaption phase, of dividing a region between two maximum incident angles into a plurality of said incident angle ranges, said incident angle ranges in said plurality being of identical size and being applicable to all of said transducers in said aperture.

4. A method as claimed in claim 3 wherein the step of calculating deviating values is further defined by integrating the deviating values over the transducers of the aperture for each depth region and for each scan line separately to form a plurality of deviating value curves, each deviating value curve having a plurality of portions respectively valid for a different range of incident angles.

5. A method as claimed in claim 4 comprising the additional steps of:

forming a straight line approximation for each deviating value curve according the method of least squares;

identifying difference values between each deviating value curve and the associated straight line approximation; and forming a corrected deviating value curve from said difference values.

6. A method as claimed in claim 5 comprising the additional step of averaging all corrected deviating value curves for identical ranges of incident angles from different scan lines and depth regions to generate an auxiliary correction value curve for all of the transducers for each range of incident angles.

7. A method as claimed in claim 6 comprising the additional step of subjecting each corrected deviating value curve to the process of aligning before the step of averaging.

8. A method as claimed in claim 6 comprising the additional step of forming a cross-correlation function for echo signals incident substantially perpendicularly on said transducer array for all depth regions and using the cross-correlation function for said echo signals as the auxiliary correction values for the angular range covering the perpendicular.

9. A method as claimed in claim 6 comprising the additional step of eliminating the effect of different integration constants in each corrected deviating value curve before the step of averaging.

10. A method as claimed in claim 9 comprising the additional step of weighting the corrected deviating values, for which the effect of the non-identical integration constant has been eliminated, according to the height of a maximum of the correlation function before the step of averaging.

11. A method as claimed in claim 6 comprising the additional steps of:
grouping the correction values for the transducers of the aperture corresponding to the range of incident angles in which the echo signals are incident on the transducers, said correction values being taken from said auxiliary correction value curves; and
adding a constant to the sections of the auxiliary correction value curves corresponding to the correction values taken therefrom so that no discontinuities appear at the joints of a correction value curve for the aperture formed by the sections of the auxiliary correction value curve.

12. A method as claimed in claim 11 wherein said correction values for a center of the aperture are taken unmodified from a section of the corresponding auxiliary value curve.

13. A method as claimed in claim 11 comprising the additional step of selecting all of said constants to be identical.

14. A method as claimed in claim 11 comprising the additional step of:
selecting said constants such that a plurality of overlapping edge-proximate auxiliary correction values of adjoining sections coincide.

15. A method as claimed in claim 2 comprising the additional steps of:
defining a plurality of depth regions on said scan line for calculating the deviating values dependent on the ranges of incident angles and on the spacing of the transducers in said aperture from said scan line;
cross-correlating the focussed echo signals of neighboring transducer in said aperture dependent on the ranges of incident angles for each depth region, the cross-correlation having integration limits defined by the intersections of the range of incident angles with the depth region; and
using the shift in the maximum of the cross-correlation on the time axis as the deviating value for one of the neighboring transducers.

16. A method as claimed in claim 15 wherein the individual boundaries of said plurality of depth regions are defined according to the following steps:
defining a boundary of depth region at a greatest distance from said transducer array as the intersection of each scan line with a range of incident angles disposed at a farthest angle from a normal of a transducer at an edge of said aperture; and
defining a remainder of adjoining depth regions lying closer to the transducer array as the intersection with each scan line of a range of incident angles deviating farthest from a normal of each transducer moving successively from said transducer at the edge of the aperture to a center of said aperture.

17. A method as claimed in claim 16 wherein the step of cross-correlating is further defined by forming a cross-correlation function for a depth region and for a range of incident angles associated therewith for the same range of incident angles in an environment of the transducer which defines the depth region, and limiting said environment by the transducers whose range of incident angles covers said depth region to a prescribed boundary.

18. A method as claimed in claim 17 wherein the step of limiting said environment is further defined by limiting said environment by the transducers whose range of incident angles covers at least half of said depth region.

19. A method for ultrasound imaging as claimed in claim 1 comprising the additional step of selecting said aperture dependent on the position of the focus on the scan line so that a constant focussing number is present for all depth regions.

20. A method as claimed in claim 1 comprising the additional steps, in said adaption phase, of:
scanning said section plane a further time line-by-line;
modifying the delay times obtained by said further scan in said adaption phase with the correction values obtained from the initial scanning in the adaption phase.

* * * * *